Aug. 19, 1958 — C. S. ABBOTT ET AL — 2,848,068
CONVEYOR LUBRICATOR

Filed May 7, 1954 — 2 Sheets-Sheet 1

INVENTORS
CARL S. ABBOTT,
HUBERT T. HUNT, JR.
LEONARD DUTTON
BY
THEIR ATTORNEY

INVENTORS
CARL S. ABBOTT,
HUBERT T. HUNT, JR.
LEONARD DUTTON.
BY
THEIR ATTORNEY

United States Patent Office 2,848,068
Patented Aug. 19, 1958

2,848,068

CONVEYOR LUBRICATOR

Carl S. Abbott, Birmingham, Hubert T. Hunt, Jr., Ecorse, and Leonard Dutton, Birmingham, Mich.; said Abbott and Dutton assignors to J. N. Fauver Co. Inc., Detroit, Mich., a corporation of Michigan Application May 7, 1954, Serial No. 428,359

1 Claim. (Cl. 184—15)

This invention relates to a lubricator and more particularly to an automatic lubricator for a conveyor. Conveyors of the type herein referred to are generally comprised of an endless chain having trolley wheels spaced at intervals along the chain and guided on an I beam or angle channel. The bearings for the trolley wheels require lubrication and they often pass through ovens with resultant breaking down of lubricant, or they pass through washers that result in corrosion of the bearings. It is therefore desirable to lubricate each bearing by an automatic device, once for each cycle of the chain.

It is an object of the present invention to provide a pumping unit, actuated by the moving conveyor, which swings in an arc during inter-engaging travel between the bearing and pumping unit, and which supplies the bearing with lubricant by a shot like action at dead center or when the bearing is on a radial line of the arc through which the pumping unit swings with the moving conveyor.

Another object of the invention is to provide an adjustable pressure regulating device for varying the amount of lubricant discharged to the pumping unit and to provide an adjustment for the timing of the device.

A further object of the invention is to provide an automatic lubricating device wherein the problem of drip is eliminated, each bearing receiving a predetermined quantity of lubricant.

Other objects and advantages of the invention will be more fully understood from the following description taken in connection with the accompanying drawings, in which.

Figure 1:
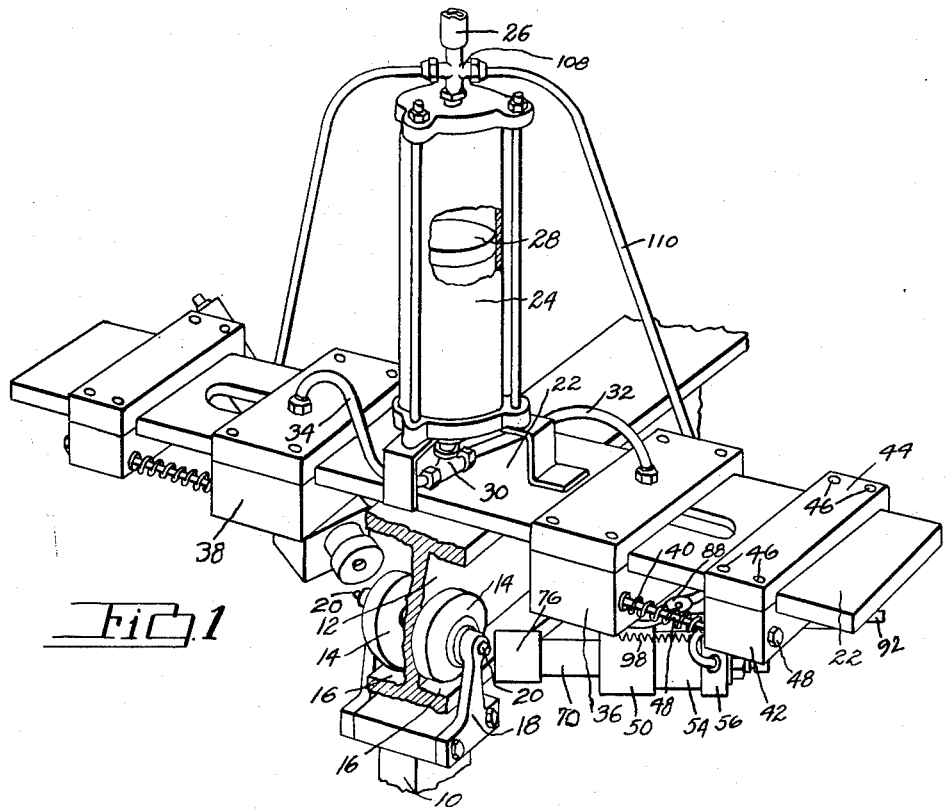
Fig. 1 is a perspective view of a dual action lubricating device wherein oppositely disposed trolley wheels are lubricated by my improved device.

Referring to the drawings, the invention has been illustrated as applied to an overhead conveyor chain 10 supported on an I beam 12. Rollers 14 are guided on the oppositely disposed lower flanges 16 of the I beam and are journaled in brackets 18 bolted to the opposite sides of the chain 10. The brackets are each provided with bushings and outwardly projecting lubricant receiving fittings 20 for supplying lubricant to the bearings in the rollers.

The conveyor is an endless chain and often travels through ovens which cause a breaking down of the lubricant or through washers where water results in corrosion of the bearings. It is therefore important to lubricate each bearing during a cycle of its travel. The improved lubricator is actuated by the movement of the conveyor as each outwardly projecting lubricant fitting passes a given position.

The improved lubricator, as illustrated in Fig. 1, is of the dual type and comprises a plate 22 extending transversely of the top of the I beam 12. Above the plate 22 and carried thereby is a lubricant supply chamber 24 from which lubricant is supplied under pressure. A fluid pressure is supplied through conduit 26 to a movable piston 28 at the top of a column of lubricant. The lubricant is conducted through a fitting 30, at the bottom of the supply chamber to flexible conduits 32 and 34. The conduits 32 and 34 are connected to housings 36 and 38 which are slidably mounted on the plate 22, one on each side of the I beam 12. Since the device is of the dual type and the units at each side of the I beam are the same, only one unit will be described, which could be successfully used where the conveyor is carried by a single roller 14.

Figure 2:
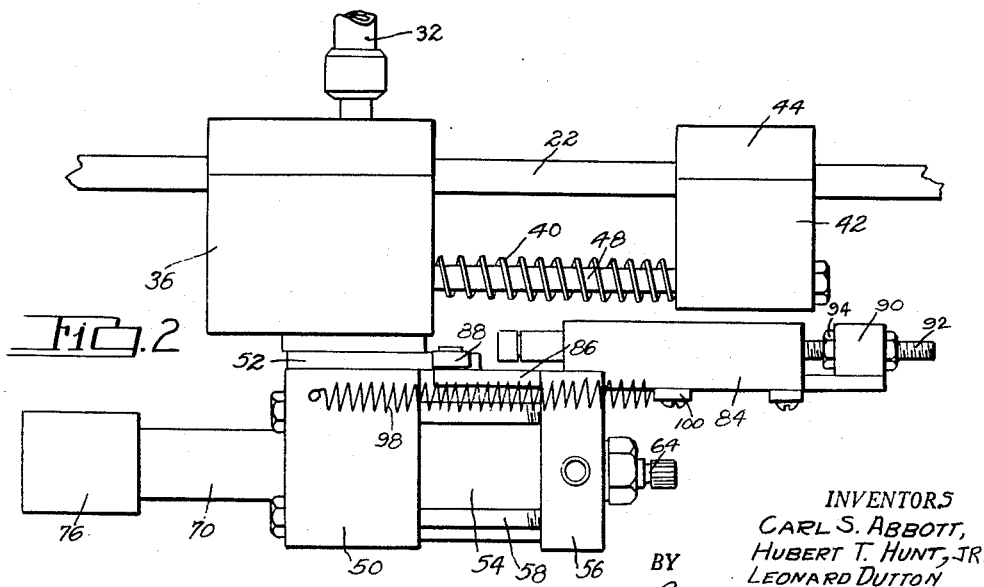
Fig. 2 is a side elevational view of one of the pumping units.
Figure 3:
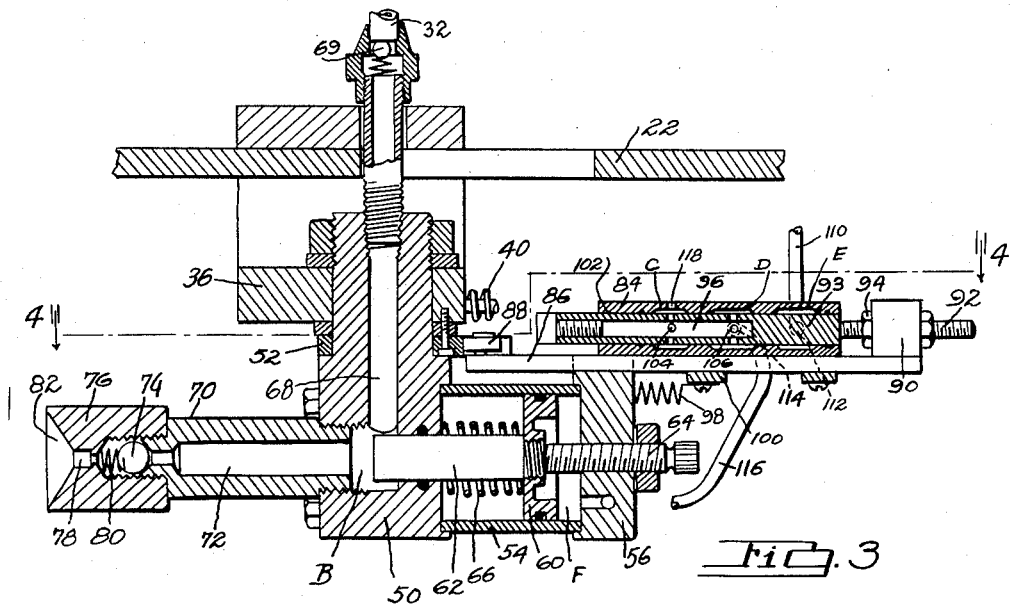
Fig. 3 is a longitudinal sectional view of Fig. 2.
Figure 4:
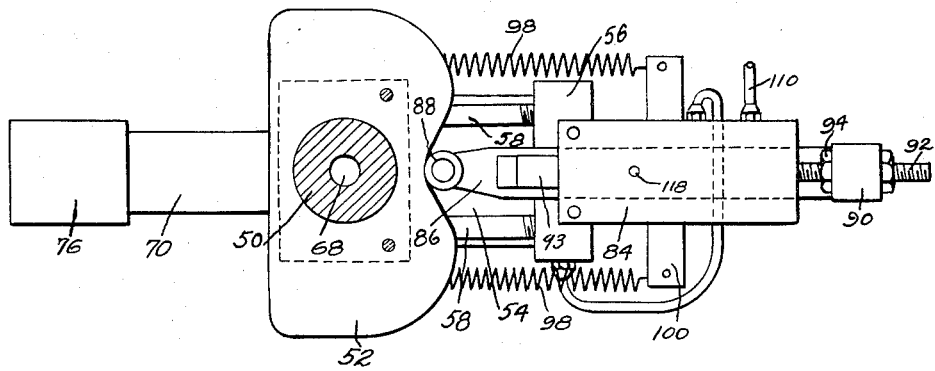
Fig. 4 is a sectional view, partly in elevation, taken on line 4—4 of Fig. 3.

Referring now to Figs. 2, 3 and 4, the slidable housing 36 is resiliently urged toward the center of the plate 22 by compression springs 40 which are adjustably tensioned by a block 42, the block being fixed to the plate 22 by a cap 44 which frictionally engages the plate 22 clamped between the cap 44 and block 42 by screws 46. Bolts 48 through the compression spring 40 extending from the block 42 and having threaded engagement with the housing 36 provide a further adjustment of the housing 36 on the plate 22. First the block 42 is adjusted for major adjustment on the plate 22 and the minor adjustments are made by the bolts 48.

The block 36 is provided with a rotatable head 50 and a cam 52 secured to the block 36. The head 50 is provided at one side thereof with a sleeve 54 and a cylinder cap 56. The sleeve 54 is held between the head 50 and cap 56 by bolts 58. The sleeve 54 receives a piston 60 and a piston rod 62 extends into a lubricant chamber B in the head 50. An adjustably positioned stop 64 is in the cylinder cap 56 to limit the travel of the piston 60 in one direction to determine the amount of piston travel; a nut being provided to lock the stop 64 in adjusted position. A coil compression spring 66 around the piston rod urges the piston 60 to its stop or retracted position.

The lubricant chamber B is provided with lubricant from the supply chamber 24 through a passage 68 in the head 50, flexible conduit 32, and fitting 30. At the opposite side of the head 50 is a nozzle 70 having a passage 72 communicating with the chamber B. A ball check 74 is located at the end of the nozzle 70 and a nozzle head 76, having a passage 78, is received on the outer end of the nozzle 70. A compression spring 80 urges the ball 74 to closed position which is normal except for pressure in the chamber B, created by the piston rod 62. The nozzle 76 has a recessed outer end 82 for receiving the lubricant fitting 20 on the conveyor 10.

The cylinder cap 56 carries a valve housing 84 and slidably mounted between the cap 56 and housing 84 is a plate 86 which carries a roller 88 in contact with the edge face of the cam 52. The opposite end of the plate 86 carries a block 90 having a valve stem 92 threaded therein. The valve stem 92 is provided with lock nuts 94 for locking the stem 92 in adjusted position relative to the block 90 and plate 86. The valve stem 92 carries a valve member 93 which is mounted for reciprocation in the housing 84, and is provided with a central, axially extending opening 96 in a portion of its length. The valve 93, threaded valve stem 92, block 90, and plate 86 are carried as a unit and reciprocating the valve 93 in the housing 84 by contact of the roller 88 on the cam 52. Oppositely disposed tension springs 98, between the cross bar guide 100 and head 50, hold roller 88 in closed engagement with the cam 52.

The valve housing 84 has a longitudinally extending opening 102 therethrough which receives the valve 93 for sliding movement therein. Spaced chambers C, D and E are formed around the inner periphery of the opening 102 and will be designated as exhaust chamber, operating pressure chamber and supply pressure chamber, respectively.

The opening 96 in the valve 93 is provided with longitudinally spaced and radially extending openings 104 and 106. The supply pressure is received from the conduit 26, fitting 108, conduit 110, passage 112 to chamber E. The chamber D is provided with a passage 114 having a connecting conduit 116 to the chamber F for conducting fluid pressure to the piston 60. The chamber C is provided with a passage 118 open to the atmosphere for the exhaust of pressure. The valve 93 is shown in Fig. 3 in the exhaust position, but when the cam 52 moves the plate 86 to the right, the valve moves with the plate and the openings 106 communicate with the supply pressure chamber E and the openings 104 communicate with the pressure chamber D. In this position the fluid pressure in conduit 110 flows to chamber E, through openings 106, to chamber D, out passage 114 through conduit 116, to chamber F, forcing the piston 60 and rod 62 to the left. This action causes a shot of lubricant to be forced through the passage 72 and out of the nozzle head 76.

The lubricant under pressure in the chamber B is restricted against a return flow, through passage 68 to the supply chamber 24, by a check valve 69 which permits the fluid to flow only in a direction to the chamber B.

When the valve 93 is returned to the position shown in Fig. 3, the openings 104 communicate with the chamber C and the openings 106 communicate with the chamber D releasing the pressure in chamber F and the spring 66 returns the piston 60 and its rod 62 for another operation; the pressure escaping through conduit 116, passage 114, openings 106, openings 104 and 118 to the atmosphere. Piston 60 and piston rod 62 remain in position until time for their next pick up position.

We claim:

A lubricator for a movable conveyor comprising, a support, a lubricant reservoir carried by said support, a housing slidable on said support for movement toward and away from the conveyor, a rotatable head carried by said housing, said head having a lubricant chamber, a communication between said reservoir and said lubricant chamber, a piston in said lubricant chamber, an operating pressure chamber for moving said piston into said lubricant chamber, a lubricant discharge nozzle leading from said lubricant chamber, a cam carried by said housing, a slide plate movable by said cam, a valve housing carried by said rotatable head having an exhaust passage open to the atmosphere, an opening communicating with said pressure chamber, and an opening communicating with a supply pressure, a movable valve member in said valve housing carried by said slide plate forming a communication from the supply pressure opening to said operating pressure chamber when said valve is in one position, and for forming a communication between said operating pressure chamber and the exhaust passage when said valve is in another position, adjustable means for positioning said movable valve member relative to said slide plate, and spring means for moving said piston in opposition to said operating pressure chamber.

References Cited in the file of this patent

UNITED STATES PATENTS

| 1,567,623 | Smith | Dec. 29, 1925 |
| 2,658,585 | Klein et al. | Nov. 10, 1953 |

FOREIGN PATENTS

| 392,146 | Great Britain | Apr. 27, 1933 |
| 571,844 | Great Britain | Sept. 11, 1945 |